March 26, 1957     A. KURTI     2,786,699

INTERSHAFT OIL SEAL

Filed April 30, 1954

*INVENTOR*
*ALEXANDER KURTI*
BY Charles A. Warren
    *ATTORNEY*

United States Patent Office 2,786,699
Patented Mar. 26, 1957

2,786,699

INTERSHAFT OIL SEAL

Alexander Kurti, North Woodbury, Conn., assignor to United Aircraft Corporation, East Hartford, Conn., a corporation of Delaware Application April 30, 1954, Serial No. 426,717

1 Claim. (Cl. 286—11.11)

This invention relates to an oil seal and particularly to a carbon type of oil seal.

One feature of the invention is an arrangement of a face seal with a means by which to hold the seal in operative position by centrifugal force. Another feature is the use of a series of balls which act by centrifugal force to hold the seal in operative position with a cage for holding the balls in predetermined spaced relation.

If a carbon seal ring is used as an intershaft seal, it becomes difficult to design a pressure balanced seal. In addition, the seal will rotate with some speed between the inner shaft and outer shaft speed; this rotation produces centrifugal loads sealing the carbon seal ring against the outer shaft. As there is unavoidable axial motion between the two shafts, the seal has to slide with the shaft carrying it or it will tend to open up and leak. To force the carbon ring to slide axially, overcoming the friction caused by pressure and centrifugal load, the carbon ring is presently spring loaded.

This presents a twofold problem in that first, the spring has to be designed to overcome the maximum frictional force, and in all operational conditions such as cruising and idling, where the frictional force is lower, the spring has an excess power producing seal wear and reducing the life of the seal and second, it becomes difficult to design a spring in the available space, especially one with a flat load-deflection curve which is desirable to make the load independent of seal wear. One feature of the invention is the solution of both of these problems by using centrifugal force for the axial loading of the seal. This produces a variable axial load with a high load where the resistance due to friction is high and vice versa. One feature is the loading of the seal by balls and the control of the loading pressure by selecting the proper size and number of balls and the angle of the wedge surface on which the load is acting. Another feature is that the load at any selected speed is constant and independent of seal wear.

Other objects and advantages will be apparent from the specification and claim, and from the accompanying drawings which illustrate an embodiment of the invention.

Figure 1:
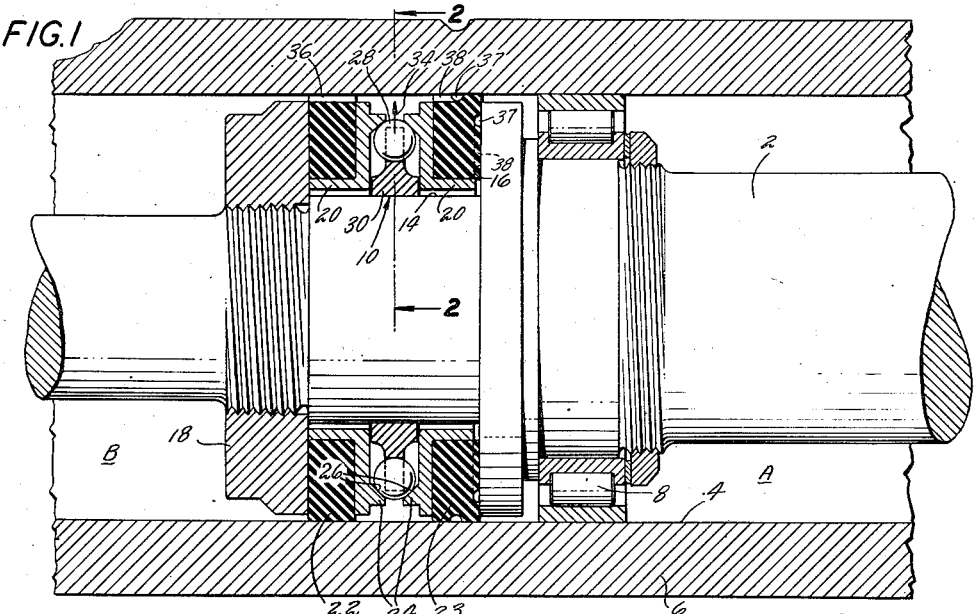
Fig. 1 is a transverse sectional view of the seal.

The invention is shown in an arrangement in which oil and air leakage along a shaft 2 is to be prevented. The shaft 2 is located in a bore 4 in a housing 6 being supported therein as by a bearing 8. A seal assembly 10 prevents oil from working its way along the surface of the shaft or the surface of the bore and also functions as a pressure seal assembly where there is a pressure differential on opposite sides of the seal. The seal assembly is positioned in an annular recess 14 formed in the shaft between a shoulder 16 and a cap 18 attached to and forming a part of the shaft. The housing may also be rotatable in the same or opposite direction to the shaft 2.

The seal assembly includes unsplit rings 20 substantially L-shaped in cross section as shown in Fig. 1 to receive therein split rings 22 and 23 formed of carbon or similar seal-forming material. These carbon rings are held laterally against the adjacent surface on the shaft and they are also held radially outward against the inside surface 4 in the housing by centrifugal force. It will be understood that rings 22 and 23 project beyond the L-shaped supporting rings 20 to prevent the latter from engaging the sealing surfaces on the shaft and housing.

The radially extending portions of the L-shaped supporting rings 20 have flanges 24 thereon projecting in a direction away from the rings 22 and 23 and in juxtaposition to each other. The radially inward surfaces 26 on these flanges are obliquely arranged to receive and support a row of balls 28, the spacing of which is maintained by a ring-shaped cage member 30 located radially inward from the row of balls and having radial slots 32 in its periphery which provide for radial movement of the balls with respect to the cage under the influence of centrifugal force. The slots 32 are slightly wider than the balls to provide free radial movement. The cage is supported on the shaft 2 to keep it concentric to the shaft and to the seals.

As the shaft rotates, carrying with it the seals, it will be apparent that, under centrifugal force, the balls exert a force on the flanges 24 in a radially outward direction (in the direction of the arrow 34) thereby, through the wedging action on the obliquely extending surfaces 26, urging the rings 22 and 23 apart and into engagement with the sealing surfaces on the shaft. Thus, the sealing pressures on the shoulder 16 and cap vary as a function of the shaft speed. The centrifugal force and air pressure on the split carbon rings 22 and 23 is sufficient to provide the sealing pressure on the bore 4. The balls do not affect the radial sealing pressure since the L-shaped rings are not split.

Where there is a pressure differential across the seal, as for example, where the pressure in space A in which bearing 8 is located is lower than the pressure in space B on the other side of the seal, the carbon ring 23 is seated by the pressure differential. The pressure fluid enters into the space between the rings 22 and 23 through axial grooves 36 of ring 22 so that the sealing is performed by ring 23 with the pressure fluid assisting the action of the balls 28 in holding the seal ring 23 against the cooperating shoulder 16. The ring 22 (the ring adjacent to the high pressure) acts merely as a bearing ring to transfer the axial reaction of the balls to cap 18.

It may be advantageous to reduce the sealing area or to reduce the pressure between the seal ring and the cooperating surface as by forming a circumferential groove 37 in each sealing face of ring 23 together with one or more transverse grooves 38 to allow the pressure fluid to enter the grooves and balance to some extent the fluid pressure acting on the opposite side of the seal.

Figure 3:
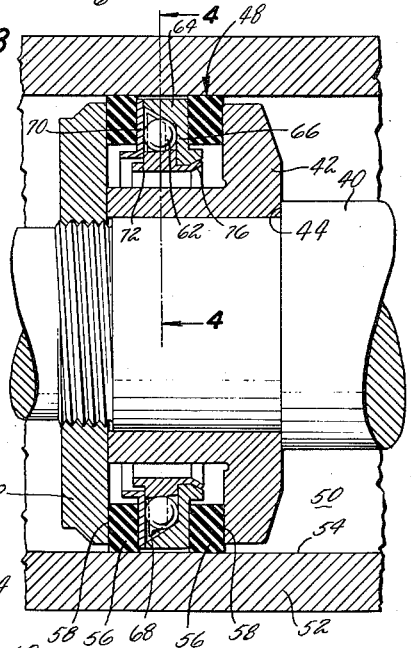
Fig. 3 is a sectional view similar to Fig. 1 showing a modification.
Figure 4:
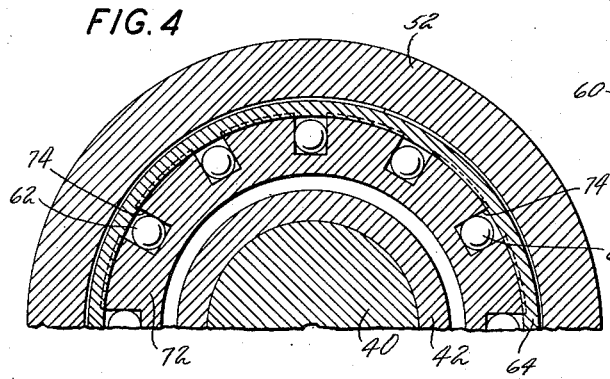
Fig. 4 is a sectional view substantially along line 4—4 of Fig. 3.

In the arrangement of Figs. 3 and 4, the shaft 40 carries a surrounding ring 42 fitting against a shoulder 44 on the shaft 40 and the ring carries a seal assembly 48 to prevent leakage past the seal in the space 50 between the shaft and the surrounding housing 52, the latter having a bore 54 with which the seal engages. The seal shown has two carbon rings 56 which are split and which engage with spaced radial surfaces 58 on the ring 42 and on a cooperating member 60 also fixed on the shaft. The carbon rings 56 also engage circumferentially with the bore 54.

Figure 2:
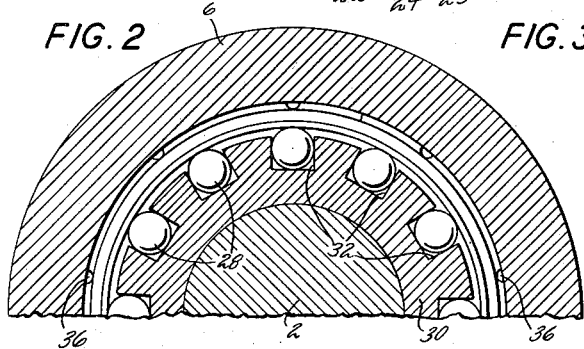
Fig. 2 is a sectional view substantially along line 2—2 of Fig. 1.

The seals are urged apart by centrifugal force acting on a row of balls 62 supported in a ring 64. The ring has a radial surface 66 terminating in an obliquely extending surface 68 with which the balls engage for exerting the wedging action by which the seals are forced apart. The opposite radial surface of the ring 64 engages one of the sealing rings 56. The other sealing ring has a radially extending supporting disc 70 against which the balls engage as they move radially against the surface 68. The balls are held in circumferentially spaced relation to each other by a cage 72 in the form of a ring located for the most part radially inward of the row of balls and with radially extending slots 74 in its periphery to receive the balls. The cage carries a flange 76 projecting laterally adjacent to the inner edge thereof and extending over the inner surface of ring 64. The flange 76 causes cage 72 to rotate with the ring 64 to minimize rolling of the balls. The flange 76 may be bent over the inner surface of ring 64 to hold the cage 72 and ring 64 in predetermined relation. The rings may be grooved as described above in connection with Figs. 1 and 2.

It is to be understood that the invention is not limited to the specific embodiment herein illustrated and described, but may be used in other ways without departure from its spirit as defined by the following claim.

I claim:

In a seal construction, a rotary inner member having a shoulder defining a substantially radial sealing face and a threaded portion spaced therefrom, a surrounding member defining a substantially cylindrical sealing face and relative to which the inner member rotates, a sealing ring having a substantially radial surface and an outer substantially cylindrical surface engaging respectively with said radial sealing face and said cylindrical sealing face, a ring member attached to said sealing ring, said ring member having thereon a laterally projecting flange on the side remote from the substantially radial surface on the sealing ring, said flange having a surface extending obliquely to the axis of said seal construction, a series of circumferentially spaced balls engaging said obliquely extending surface, a cooperating member having a surface engaging with said balls for limiting the axial movement of said balls to retain them in engagement with said oblique surface, a threaded ring engaging the threaded portion on said inner member and supporting said cooperating member such that, under the action of centrifugal force, as the sealing ring, said ring member and the balls rotate with the inner member, the centrifugal force acting on the balls will be transmitted to the sealing ring to hold the radial sealing surface thereon against said radial sealing face and a cage for retaining the circumferential spacing of said balls, said cage having spaced radial slots to receive the balls, said slots being radially deep enough for radial movement of the balls therein.

References Cited in the file of this patent

UNITED STATES PATENTS

| 1,861,275 | Hopkins | May 31, 1932 |
| 2,556,393 | Holben | June 12, 1951 |

FOREIGN PATENTS

| 573,481 | Great Britain | Nov. 22, 1945 |